(12) United States Patent
Tsai et al.

(10) Patent No.: US 8,603,425 B2
(45) Date of Patent: Dec. 10, 2013

(54) METHOD FOR FABRICATING AN EXFOLIATED INORGANIC LAYERED MATERIAL

(75) Inventors: Tsung-Yen Tsai, Taoyuan County (TW); Chien-Hsiang Hsieh, Taoyuan County (TW); Chien-Lin Yeh, Taoyuan County (TW); Chung-Chih Lin, Taoyuan County (TW)

(73) Assignees: Chung Yuan Christian University, Jhongli City, Taoyuan County (TW); Frank & Associates Plastic Co., Ltd., Taoyuan County (TW)

( * ) Notice: Subject to any disclaimer, the term of this patent is extended or adjusted under 35 U.S.C. 154(b) by 291 days.

(21) Appl. No.: 13/101,786

(22) Filed: May 5, 2011

(65) Prior Publication Data
US 2012/0041125 A1    Feb. 16, 2012

(30) Foreign Application Priority Data
Aug. 12, 2010   (TW) .............................. 99126881 A

(51) Int. Cl.
*C01B 33/26* (2006.01)
*C08K 3/34* (2006.01)

(52) U.S. Cl.
USPC ....................... 423/328.2; 524/445

(58) Field of Classification Search
USPC ........................ 524/445; 423/328.2
See application file for complete search history.

(56) References Cited

U.S. PATENT DOCUMENTS

| 6,649,713 B2 * | 11/2003 | Tang et al. ................. 526/160 |
| 6,765,050 B2 | 7/2004 | Lin et al. |
| 6,822,019 B2 | 11/2004 | Lin et al. |
| 7,022,299 B2 | 4/2006 | Lin et al. |
| 7,125,916 B2 | 10/2006 | Lin et al. |

FOREIGN PATENT DOCUMENTS

| TW | I270529 | 1/2007 |
| TW | I280261 | 5/2007 |
| TW | 200924840 | 6/2009 |

* cited by examiner

*Primary Examiner* — Kelechi Egwim
(74) *Attorney, Agent, or Firm* — Muncy, Geissler, Olds & Lowe, PLLC

(57) ABSTRACT

The invention provides a method for fabricating an exfoliated inorganic layered material. The method includes: providing a homogeneous precursor solution, wherein the homogeneous precursor solution includes a titanium derivatives solution or a silane derivatives solution; adding an inorganic layered material into the homogeneous precursor solution to form a sol; coagulating the sol by a hydrothermal method to obtain a wet gel; and washing, drying and calcining the wet gel to obtain an exfoliated inorganic layered material.

14 Claims, 2 Drawing Sheets

METHOD FOR FABRICATING AN EXFOLIATED INORGANIC LAYERED MATERIAL

CROSS REFERENCE TO RELATED APPLICATIONS

This Application claims priority of Taiwan Patent Application No. 99126881, filed on Aug. 12, 2010, the entirety of which is incorporated by reference herein.

BACKGROUND OF THE INVENTION

1. Field of the Invention

The present invention relates to an inorganic layered material, and in particular relates to a method for fabricating an exfoliated inorganic layered material.

2. Description of the Related Art

Of various inorganic layered materials, clay is a common silicate mineral found in nature. With the advantages of small particle sizes, a crystalline layered arrangement, acid and alkali resistance, heat resistance and high mechanical strength, clay is filled into polymer (used as a filler or reinforcement) to form composite materials to enhance thermal and mechanical properties thereof. A key factor for fabricating the composite material is that clay should be well dispersed in the composite material. In the conventional method, clay is firstly modified, and then the layered structures of clay are disrupted by the force of polymerization reaction to obtain exfoliated clay.

In U.S. Pat. Nos. 6,822,019, 6,765,050 and 7,022,299, and TW patent No. 1280261, a polyamine with multi-functional groups and highly branched structures is used as an organic exfoliating agent. Inorganic clay is exfoliated by the organic exfoliating agent to obtain a disordered nano-silicate plate.

In TW Publication Application No. 200924840, charges in clay are exchanged with metal ions. Then, the metal ions are reduced by a reducing agent to obtain disordered nano-silicate plate clay.

In TW Patent No. 1270529 and U.S. Pat. No. 7,125,916, amine-terminating oligomers (AMO) are obtained by polymerization of polyoxypropylene diame, p-cresol and formaldehyde and are used as an intercalating agent. Exfoliated clay is exfoliated by the displacement reaction of AMO. A solution comprising a hydroide or a chloride of alkali metal or alkaline-earth metal, ethanol, water, an organic solvent and exfoliated clay are mixed and filtered to obtain layered nano-silicate plates.

U.S. Pat. No. 6,649,713 discloses clay, first being modified by aliphatic amine and then silica, wherein titanium dioxide nanometer particles are then incorporated into the clay by a sol-gel method. Next, by polymerization of the catalyst (such as ethylene or propylene) and the above mixture, a clay nano-composite material is obtained.

However, the above-mentioned exfoliating methods are all applied to clay. Thus, there is a need to develop an exfoliating method which is applied to inorganic layered material other than clay.

BRIEF SUMMARY OF THE INVENTION

The invention provides a method for fabricating an exfoliated inorganic layered material, comprising: providing a homogeneous precursor solution, wherein the homogeneous precursor solution includes a titanium derivatives solution or a silane derivatives solution; adding an inorganic layered material into the homogeneous precursor solution to form a sol; coagulating the sol by a hydrothermal method to obtain a wet gel; and washing, drying and calcining the wet gel to obtain an exfoliated inorganic layered material A detailed description is given in the following embodiments with reference to the accompanying drawings.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF THE INVENTION

Figure 1:
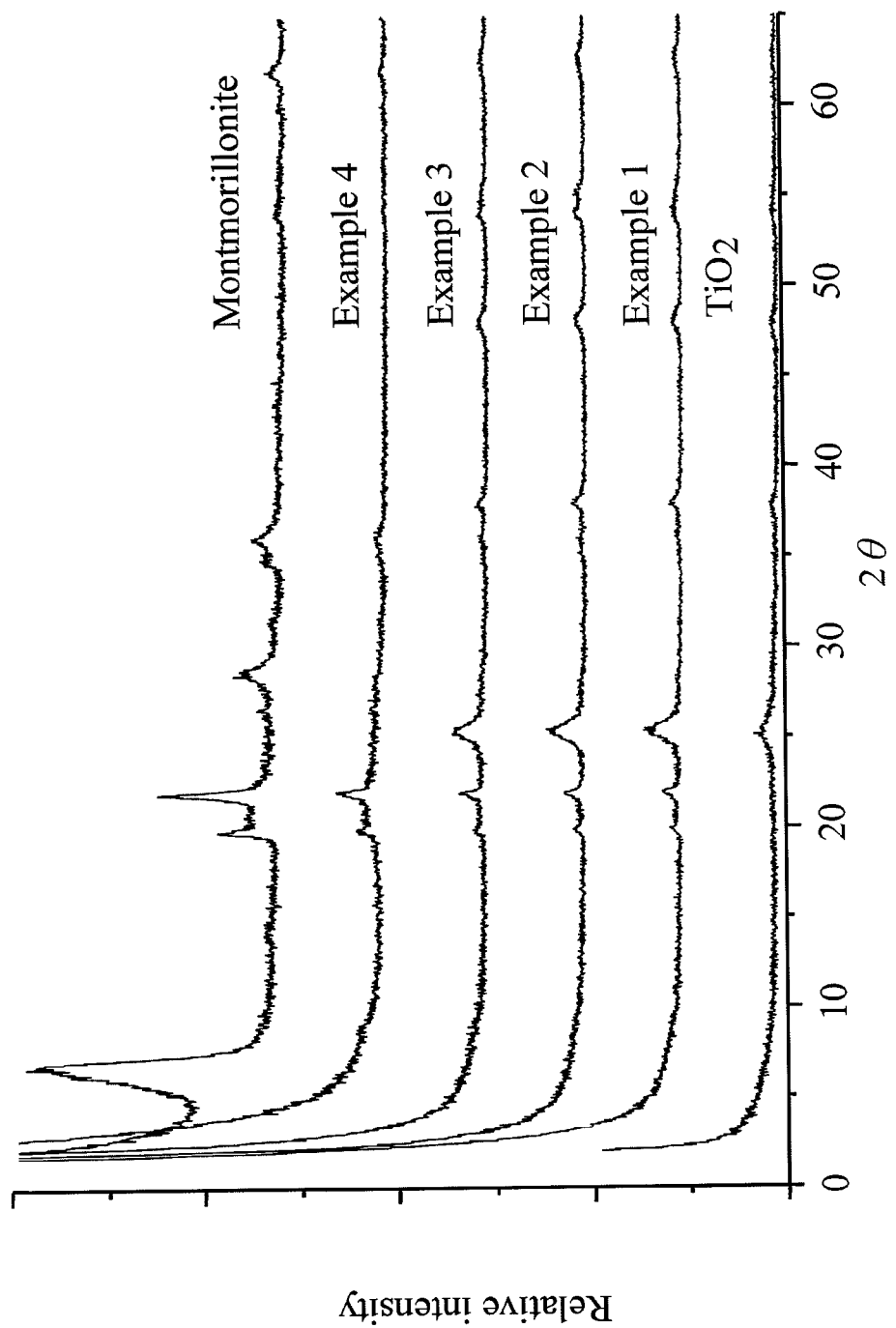
FIG. 1 shows the X-ray diffraction patterns of the exfoliated inorganic layered powder of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a method for exfoliating inorganic layered materials. The method is described as follows. Firstly, a homogeneous precursor solution is provided, wherein the homogeneous precursor solution comprises a titanium derivatives solution or a silane derivatives solution.

The invention also provides a nano-composite material, comprising: about 100 weight by part of a polymer; and about 0.1-20 weight by part of an exfoliated inorganic layered material.

The titanium derivatives solution is formed by mixing titanium alkyl alcohol, chelate and water. The titanium alkyl alcohol comprises titanium (IV) n-butoxide, titanium tetra-isopropoxide, titanium tetra-(2-ethylhexyl) or combinations thereof. The chelate comprises acetate, lactic acid, acetylacetone, ethyl acetate, tri ethanolamine or combinations thereof. In order to reduce the hydrolysis rate of titanium alkyl alcohol in water, chelate is firstly added into titanium alkyl alcohol before water to control the reaction rate. The titanium alkyl alcohol is obtained by the above-mentioned synetic method, or it is commercially available from TYZOR® DC (titanium ethyl-2-ethylacetoacetate), TYZOR® TE, TYZOR® LA (titanium lactate) (purchased from DuPont).

The silane derivatives solution is formed by mixing silane oxide, alcohol, inorganic acid and water together. The silane oxide comprises tetramethoxy silane (TAOS), tetraethoxy silane, (TEOS), tetrapropoxy silane (TPOS), tetrabutoxy silane, silicon tetraacetate, silicon tetrachloride ($SiCl_4$) or combinations thereof. The inorganic acid comprises sulfuric acid, hydrochloric acid, nitric acid, phosphoric acid, acetic acid or combinations thereof. The alcohol comprises methanol, ethanol, propanol, butanol or combinations thereof.

Then, an inorganic layered material is added into the homogeneous precursor solution to form a sol. The inorganic layered material comprises smectite clay, vermiculite, halloysite, sericite or mica, and the smectite clay comprises montmorillonite, saponite, bedidellite, nontronite, hectorite or layered double hydroxides (LDH).

In one embodiment, the homogeneous precursor solution and the inorganic layered material have a weight ratio of about 0.1:1-100:1, and preferably (3-10):1, and more preferably (0.5-1.5):1. If the ratio of the homogeneous precursor solution is too high, as a result, a large particle sized oxide product (formed after a hydrothermal method) will be obtained. If the ratio of the homogeneous precursor solution is too low, as a result, a small particle sized oxide product (formed after an hydrothermal method) will be obtained.

In one embodiment, before adding the inorganic layered material into the homogeneous precursor solution, the inorganic layered material is first swelled. Note that "swell" means that the inorganic layered material is well dispersed in water. For example, the montmorillonite is swelled by adding it into water, and the weight ratio of the montmorillonite and water is preferably about 1:20-1:50.

Next, the sol is coagulated by a hydrothermal method to obtain a wet gel. The hydrothermal method comprises a conventional hydrothermal method, microwave hydrothermal method or combinations thereof. The hydrothermal method is conducted at 30° C.-180° C. for 10 minutes-24 hours. In one embodiment, the inorganic layered material is added into the homogeneous precursor solution at 150° C. for 4 hours to conduct a sol-gel reaction.

The purpose of the hydrothermal method is to produce oxides (such as $TiO_2$ or $SiO_2$). The nanoparticles in the inorganic layered material are formed from the oxides to disrupt the stacked-layer structure of the inorganic layered material. Furthermore, the charges between the inorganic layered material are covered and shield by the oxides to exfoliate the inorganic layered material.

The crystal structure of the oxide may be controlled by the temperature of the hydrothermal method. When the temperature is too low or the reaction time is too short, small particle sized oxides will be obtained. When the temperature is too high or the reaction time is too long, large particle sized oxides will be obtained through aggregation. Generally, large oxide particle sizes are not conducive to dispersal in inorganic layered materials.

Then, the wet gel is washed, dried and calcined to obtain exfoliated inorganic layered materials in the form of powder. The wet gel is calcined at about 200° C.-600° C. for 1 hour-10 hours. In one embodiment, the wet gel is calcined at about 300° C. for 3 hours (heating rate of 5° C. per minute).

Thus, the homogeneous precursor solution conducts a hydrolysis condensation reaction in the inorganic layered material by the sol-gel method and the hydrothermal method to form the oxides. The nanoparticles in the inorganic layered material are formed from the oxides to disrupt the stacked-layer structure of the inorganic layered material. Furthermore, the charges between the inorganic layered material are covered and shield by the oxides to obtain the exfoliated inorganic layered material.

Additionally, the exfoliated inorganic layered material is further added into a polymer to form a nano-composite material and to improve the gas barrier property of the polymer, wherein the nano-composite material comprises about 100 weights by part of a polymer and about 0.1-20 weight by part of the exfoliated inorganic layered material.

The polymer comprises (but not limited to) thermo plastic polyester (such as Polyethylene terephthalate (PET), Polybutylene Terephthalate (PBT), or polylactic acid (PLA)), polyene (such as Polyethylene (PE), Poly propylene, (PP), Polystyrene (PS)), acrylic resin (such as polymethylmethacrylate (PMMA) or polyacrylate, thermo setting epoxy (such as Novolac).

In one embodiment, the exfoliated inorganic layered material of the invention is added into polymethylmethacrylate (PMMA) to measure gas permeable properties (using gas permeability analyzer, GPA). Data from the GPA shows that a PMMA film with the exfoliated inorganic layered material has higher gas barrier gas, compared with that of a PMMA film without the exfoliated inorganic layered material.

EXAMPLE

Example 1

3.55 g of titanium tetra-isopropoxide and 22.48 g of acetate were first mixed, and then 11 ml of the deionized water was added into the mixture. The titanium tetra-isopropoxide was hydrolysed to from a transparent clear solution. Then, the swelled montmorillonite (NTC-C34, purchased from CHINA GLAZE CO., LTD.) was added into the transparent clear solution to from a sol. 15 ml of sol was put into a high pressure autocave at 150° C. (heating rate of 10° C. per minute) for 0.5 hour to conduct a hydrothermal reaction to from a wet gel. Then, the wet gel was centrifuged, washed, dried and calcined at 300° C. (heating rate of 5° C. per minute) for 3 hours to form an exfoliated inorganic layered powder.

Example 2

The fabrication method of Example 2 was similar to that of Example 1, with the difference being that the hydrothermal reaction was conducted for 4 hours.

Example 3

The fabrication method of Example 3 was similar to that of Example 1, with the difference being that 0.71 g of titanium tetra-isopropoxide and 4.50 g of acetate were mixed, and the hydrothermal reaction was conducted for 4 hours.

Example 4

0.5 g of montmorillonite (NTC-C34, purchased from CHINA GLAZE CO., LTD.) 15 ml of the deionized water, 1.735 g of tetraethoxy silane and 0.3 ml nitric acid (1M) were mixed by ultrasonication to form a homogeneous sol (pH=1.93). Then, 15 ml of sol was put into a high pressure autocave at 100° C. (heating rate of 10° C. per minute) for 4 hours to conduct a hydrothermal reaction to from a wet gel. Then, the wet gel was centrifuged, washed, dried and calcined at 300° C. (heating rate of 5° C. per minute) for 3 hours to form an exfoliated inorganic layered powder.

Example 5

1 ml of nitric acid and 13.2 ml of deionized water were firstly mixed, and then 5 g of titanium(IV) butoxide (reagent grade) was slowly added into the mixture to form a mixed solution. The mixed solution was stirred at 45° C. and until transparent. Then, the upper organic phase was extracted and mixed with 0.5 g of montmorillonite to form a sol. 15 ml of sol was put into a high pressure autocave at 50° C. (heating rate of 10° C. per minute) for 4 hour to conduct a hydrothermal reaction to from a wet gel. Then, the wet gel was centrifuged, washed, dried and calcined at 300° C. (heating rate of 5° C. per minute) for 3 hours to form an exfoliated inorganic layered powder.

FIG. 1 shows the X-ray diffraction pattern of the exfoliated inorganic layered powder in Example 1-4 and montmorillonite (NTC-C34). As shown in FIG. 1, the characteristic peak of montmorillonite (NTC-C34) was 6.86 degree, while no 6.86 degree characteristic peak appeared in Example 1-4.

Thus, the data showed that the inorganic layered material was indeed exfoliated by the sol-gel method.

Figure 2:
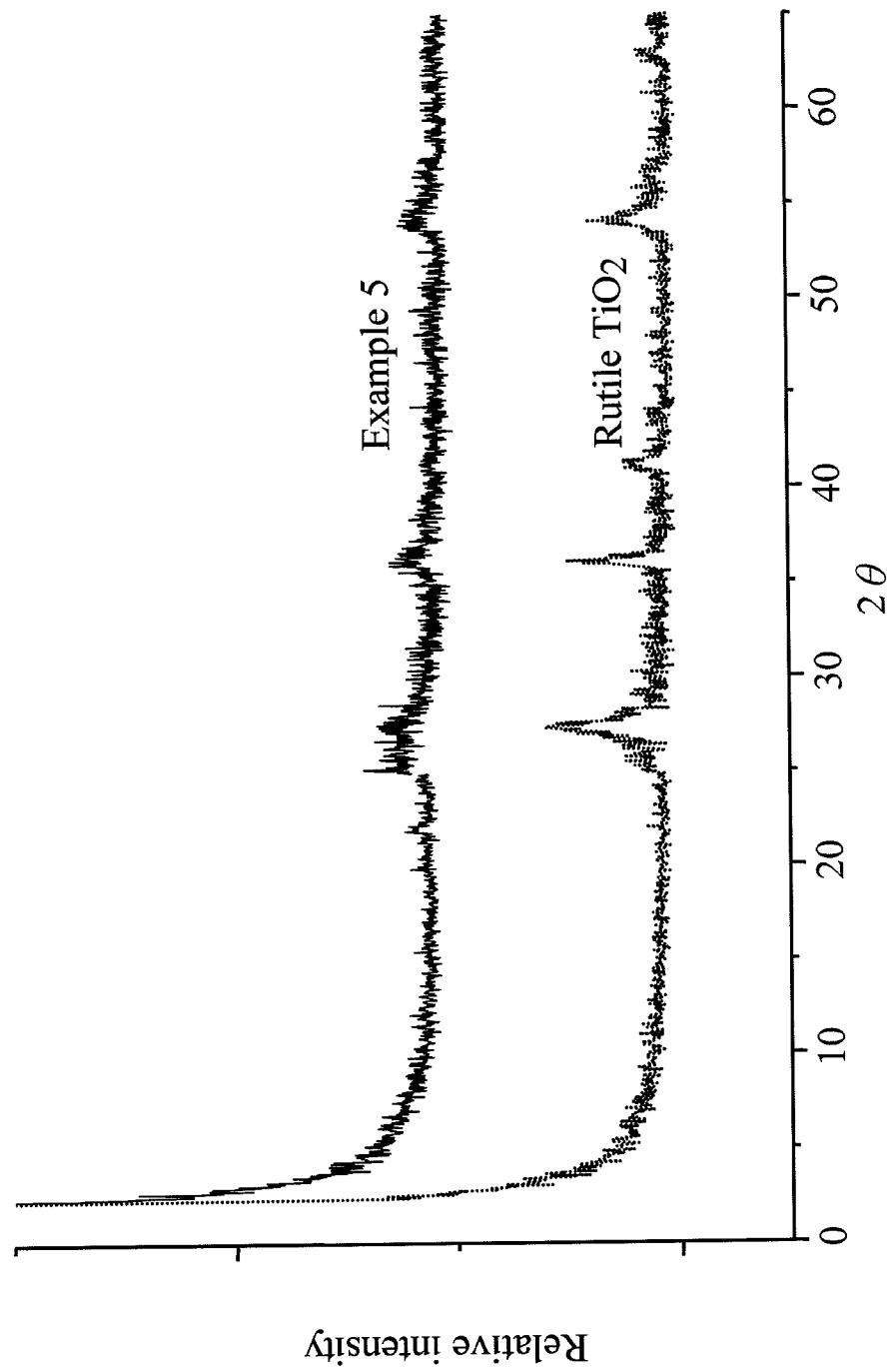
FIG. 2 shows the X-ray diffraction patterns of the exfoliated inorganic layered powder of the invention and rutile $TiO_2$.

FIG. 2 shows the X-ray diffraction pattern of the exfoliated inorganic layered powder in Example 5 and rutile $TiO_2$. As shown in FIG. 2, the characteristic peak of montmorillonite (NTC-C34) was 6.86 degree, while no 6.86 degree characteristic peak appeared in Example 5 and a rutile $TiO_2$ was formed in Example 5.

0.005 g of the exfoliated inorganic layered powder of Example 2, 3 and 4, 0.495 g of polymethylmethacrylate (PMMA, purchased from ALDRICH, average molecular weight=350000) and 9.5 g NMP were mixed together for one day. The mixture was coated on the glass (6 cm×6 cm) at 60° C. for 24 hours to evaporate solvent to form a PMMA film.

The gas permeability of the PMMA film was measured by a gas permeability analyzer (GPA). As shown in Table 1, the oxygen permeability of Example 2, 3 and 4 were respectively decreased from 1.01 (pure PMMA film) to 0.65, 0.28 and 0.61, and the nitrogen permeability of Example 2, 3 and 4 were respectively decreased from 0.63 (pure PMMA film) to 0.26, 0.03 and 0.16. Thus, the gas barrier property of polymer was improved by adding the exfoliated inorganic layered powder of the invention.

TABLE 1

|  | film thickness | amount of gas pass through the film (μL) | | gas permeability (barrers) | |
| --- | --- | --- | --- | --- | --- |
|  | (μm) | $O_2$ | $N_2$ | $O_2$ | $N_2$ |
| Pure PMMA | 76 | 0.9225 | 2.3001 | 1.01 | 0.63 |
| Example 2 | 54.3 | 0.8349 | 1.3281 | 0.65 | 0.26 |
| Example 3 | 49.5 | 0.3973 | 0.1979 | 0.28 | 0.03 |
| Example 4 | 71.8 | 0.5881 | 0.6162 | 0.61 | 0.16 |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for fabricating an exfoliated inorganic layered material, comprising:
   providing a homogeneous precursor solution, wherein the homogeneous precursor solution comprises a titanium derivatives solution or a silane derivatives solution;
   adding an inorganic layered material into the homogeneous precursor solution to form a sol;
   coagulating the sol by a hydrothermal method to obtain a wet gel; and
   washing, drying and calcining the wet gel to obtain an exfoliated inorganic layered material.

2. The method for fabricating an exfoliated inorganic layered material as claimed in claim 1, wherein providing the titanium derivatives solution comprises:
   mixing titanium alkyl alcohol, chelate and water to form the homogeneous precursor solution.

3. The method for fabricating an exfoliated inorganic layered material as claimed in claim 2, wherein the titanium alkyl alcohol comprises titanium (IV) n-butoxide, titanium tetraisopropoxide, titanium tetra-(2-ethylhexyl) or combinations thereof.

4. The method for fabricating an exfoliated inorganic layered material as claimed in claim 2, wherein the chelate comprises acetate, lactic acid, acetylacetone, ethyl acetate, tri ethanolamine or combinations thereof.

5. The method for fabricating an exfoliated inorganic layered material as claimed in claim 1, wherein providing the silane derivatives solution comprises:
   mixing silane oxide, alcohol, inorganic acid and water to form the homogeneous precursor solution.

6. The method for fabricating an exfoliated inorganic layered material as claimed in claim 5, wherein the silane oxide comprises tetramethoxy silane (TAOS), tetraethoxy silane, (TEOS), tetrapropoxy silane (TPOS), tetrabutoxy silane, silicon tetraacetate, silicon tetrachloride ($SiCl_4$) or combinations thereof.

7. The method for fabricating an exfoliated inorganic layered material as claimed in claim 5, wherein the alcohol comprises methanol, ethanol, propanol, butanol or combinations thereof.

8. The method for fabricating an exfoliated inorganic layered material as claimed in claim 5, wherein the inorganic acid comprises sulfuric acid, hydrochloric acid, nitric acid, phosphoric acid, acetic acid or combinations thereof.

9. The method for fabricating an exfoliated inorganic layered material as claimed in claim 1, wherein the homogeneous precursor solution and the inorganic layered material have a weight ratio of about 0.1:1-100:1.

10. The method for fabricating an exfoliated inorganic layered material as claimed in claim 1, wherein the inorganic layered material comprises smectite clay, vermiculite, halloysite, sericite or mica.

11. The method for fabricating an exfoliated inorganic layered material as claimed in claim 1, wherein the hydrothermal method is conducted at about 30° C.-180° C. for about 10 minute-24 hours.

12. The method for fabricating an exfoliated inorganic layered material as claimed in claim 1, wherein the wet gel is calcined at 200° C.-600° C. for 1 hour-10 hours.

13. The method for fabricating an exfoliated inorganic layered material as claimed in claim 1, further comprising adding the exfoliated inorganic layered material into a polymer.

14. The method for fabricating an exfoliated inorganic layered material as claimed in claim 13, wherein the polymer comprises thermo plastic polyester, polyene, acrylic resin or thermo setting epoxy.

* * * * *